Patented Dec. 22, 1942

2,306,057

UNITED STATES PATENT OFFICE 2,306,057

PRODUCTION OF UREA-FORMALDEHYDE RESINS

John Edward Howard Hayward, South Yardley, Birmingham, England, assignor to Bakelite Corporation, New York, N. Y., a corporation of New Jersey No Drawing. Application August 15, 1940, Serial No. 352,716. In Great Britain August 25, 1939

9 Claims. (Cl. 260—69)

The invention relates to urea-formaldehyde resins and to their use as adhesives and as moulding materials.

It is the object of the invention to prepare hardenable urea-formaldehyde condensation products in a form in which they are free from the tendency to harden prematurely. The products are intended primarily for use in adhesives and in mouldable compositions.

According to the present invention an adhesive or a mouldable composition having a basis of a hardenable urea-formaldehyde resin composition is prepared by a method which includes the steps of producing and mixing two urea-formaldehyde condensation products which individually are stable and which when mixed form a third product which is hardenable or can be readily rendered hardenable by means of an acid as catalyst. The two separately produced condensation products can thus be held in store and mixed shortly before use so that the normal tendency of hardenable urea-formaldehyde resins to harden prematurely during storage will not cause any undue difficulty.

The term "urea-formaldehyde condensation products" as used in this specification includes not only resins produced from urea but resins produced from thiourea or from a mixture of thiourea and urea.

The invention is applicable both to the production of adhesives, for example adhesives employed for securing two or more surfaces as in plywood and also to the production of mouldable compositions in which the resin is employed as a bonding medium for example for bonding mineral or fibrous fillers in powdered or sheet form.

Preferably in carrying out the invention the first component resin is prepared by condensing, in alkaline medium, urea and formaldehyde in the molecular ratio of one gram molecule of urea to not substantially less than two gram molecules of formaldehyde (H.CHO), adding an acid and reacting further, and finally neutralizing. The product may if desired be concentrated either before or after neutralizing. Such a condensation product is stable at room temperature but may be rendered hardenable by the addition of an acid as catalyst.

The second component is preferably prepared by condensing urea and formaldehyde in the molecular ratio of one gram molecule of urea to between one and two gram molecules of formaldehyde (H.CHO) in the presence of a hardening inhibitor for example ammonia. The hardening inhibitor gives stability on storage and temporary non-hardening properties and should be present in proportions sufficient to prevent the hardening of the second component alone but insufficient in quantity to prevent hardening of the two resins when mixed in the desired proportions.

According to a modification of the above-mentioned process, the acid may be included in the second component in sufficient quantity to harden the mixture of the two components. In these circumstances there must be sufficient ammonia or other inhibitor in the second component to render the acid in the second component inoperative prior to mixing, but it must be insufficient to prevent hardening when the two resins are mixed.

Other examples of inhibitors of hardening which may be used in place of ammonia are organic amines, for example alkylamines, e. g. the ethylamines or triethanolamine.

The acid necessary to catalyze the hardening of the mixture of the two urea-formaldehyde condensation products may be a strong mineral acid such as hydrochloric acid, or a weak acid or a salt such as ammonium thiocyanate which under the conditions of hardening liberates an acid. When salts such as ammonium thiocyanate are employed as the source of acid catalyst, it is believed that the preferential reaction between ammonia and the urea resin renders available the acid group of the salt to act as hardening catalyst.

By means of the invention it is possible to combine stability in the component syrups with desirable water resistance in the final products. It is known that optimum water-resistance with urea-formaldehyde condensation products occurs at a molecular ratio of urea:formaldehyde of 1:approximately 1.5. According to the present invention, the first component may be prepared with a molecular proportion of 1:about 2, in order to ensure stability. The second component, which is stabilized by the presence of a considerable quantity of ammonia or other inhibitor may be prepared with a molecular proportion of 1:considerably less than 2, so that the two resins, when mixed in the correct proportions, give a molecular constitution of 1:approximately 1.5, thus securing the advantages of good stability of the initial condensation products with maximum water-resistance of the final hardened product.

The process of the invention is illustrated by the following specific examples:

EXAMPLE I

Component 1

| | Pounds |
|---|---|
| Urea | 37.5 |
| Formaldehyde (40% aqueous H.CHO) | 100 | are mixed together. Sufficient NaOH is then added to give a pH value of 8 and then the mixture is heated up to 80° C. over a period of 20 minutes.

| | Pound |
|---|---|
| 10% aqueous acetic acid | ½ | is then added and the heating continued for 50 minutes at 80° C. The product is neutralized with NaOH and concentrated under vacuum to a weight of 84 lbs.

Component 2

| | Pounds |
|---|---|
| Urea | 60 |
| Formaldehyde (40% aqueous H.CHO) | 100 |
| Ammonia (.880) | 26.2 | are mixed together and condensed by raising the temperature to 80 to 90° C. over a period of 30 minutes and concentrated under atmospheric pressure to a weight of 97.5 lbs. The product is then cooled to room temperature and 2.93 lbs. of ammonium thiocyanate are added as the acid hardening catalyst. The ammonia stabilizes the product in spite of the addition of the acid catalyst.

A mixture of these two components is particularly useful as an adhesive for forming plywood, and when required for this purpose the two resins may be mixed in the following proportions:

| | Pounds |
|---|---|
| Component 1 | 3 |
| Component 2 | 1 |

The mixture may be applied to the plywood veneer by one of the usual methods, e. g. by spraying, brushing or rolling, and the treated veneers after forming into a stack of the required thickness may be heated to give a plywood sheet at a temperature of 100° C. and at a pressure of 200 lbs. per sq. in. for a time dependent on the thickness of the stack. This time is of the order of 3 to 5 minutes per 1 mm. thickness.

If desired the adhesive mixture may have added to it a proportion of fillers such as soft wheat flour.

EXAMPLE II

Component 1

Component 1 is prepared exactly as Component 1 in Example 1.

Component 2

| | Pounds |
|---|---|
| Urea | 67.5 |
| Formaldehyde (40% aqueous H.CHO) | 100 |
| Ammonia (.880) | 5.2 | are mixed together and condensed by raising the temperature to 80 to 90° C. over a period of 20 minutes and then cooling the product to room temperature. The yield is approximately 173 lbs.

A mixture of these two components is particularly useful for the production of mouldable compositions or of laminated products prepared from fibrous sheets, for example paper or textile fabric, impregnated with the resin and subjected to heat and pressure. When required for such a purpose the two components are mixed together in proportions corresponding to their yields, that is

| | Pounds |
|---|---|
| Component 1 | 84 |
| Component 2 | 173 |

2.4 lbs. of N-hydrochloric acid are added as the acid hardening catalyst and the mixture may then be worked up into mouldable compositions, i. e. with a powdered or fibrous filler, or used in the production of laminated products in accordance with known methods.

EXAMPLE III

Component 1

| | Pounds |
|---|---|
| Aqueous formaldehyde (40% H.CHO) | 100 | is brought to pH 7.5 to 8 by the addition of NaOH. 35 lbs. urea are added and the temperature of the mixture is raised to 80° C. over a period of 30 minutes and the mixture is then cooled. 2.3 ozs. of oxalic acid solution (10% by weight) are added and the product evaporated at atmospheric pressure to a yield of 80 lbs. The syrupy product obtained is cooled and the pH adjusted to 7.5 to 8.0 by the addition of NaOH.

Component 2

| | Pounds |
|---|---|
| Urea | 60 |
| Formaldehyde (40% aqueous H.CHO) | 100 |
| Ammonia (.880) | 26.2 | are mixed together and condensed by raising the temperature to 80 to 90° C. over a period of 30 minutes and concentrated under atmospheric pressure to a weight of 97.5 lbs. The product is then cooled to room temperature and 5.86 lbs. of ammonium thiocyanate are added as the acid hardening catalyst. The ammonia prevents the premature hardening of the product in spite of the addition of the acid catalyst.

A mixture of the two components is useful as an adhesive for making plywood, and when employed for this purpose the two components may be mixed in the following proportions:

| | Pounds |
|---|---|
| Component 1 | 10 |
| Component 2 | 1 |

The mixture (to which a proportion of filler such as soft wheat flour may be added) may be applied to the plywood veneer as described in Example I.

In each of the examples thiourea may be substituted wholly or in part for urea. Similarly ammonia may be replaced by other hardening inhibitors, for example by an ethylamine or by triethanolamine.

What is claimed is:

1. Urea resin composition comprising as one component stable in water solution a neutralized product of condensation initiated under alkaline and continued under acid conditions of one mol of urea with substantially not less than two mols of formaldehyde, and as a second component stable in water solution the product of condensation of one mol of urea with from about one to two mols of formaldehyde in the presence of a hardening inhibitor selected from the group consisting of ammonia and alkyl amines, and including before use an acidic hardening catalyst, said inhibitor being in amount sufficient to prevent the hardening of the second component alone but insufficient to prevent hardening of the two components in admixture with the inclusion of the hardening catalyst.

2. Urea resin composition comprising as one component stable in water solution neutralized product of condensation initiated under alkaline and continued under acid conditions of one mol of urea with substantially not less than two mols of formaldehyde, and as a second component stable in water solution the product of condensation of one mol of urea with from about one to two mols of formaldehyde in the presence of a hardening inhibitor selected from the group consisting of ammonia and alkyl amines, and including in the second component an acidic hardening catalyst, said inhibitor being in amount sufficient to prevent the hardening of the second component alone but insufficient to prevent hardening of the two components in admixture with the inclusion of the hardening catalyst.

3. Urea resin composition comprising as one component stable in water solution a neutralized product of condensation initiated under alkaline and continued under acid conditions of one mol of urea with substantially not less than two mols of formaldehyde, and as a second component stable in water solution the product of condensation of one mol of urea with from about one to two mols of formaldehyde in the presence of a hardening inhibitor selected from the group consisting of ammonia and alkyl amines, and including before use an acidic hardening catalyst, said inhibitor being in amount sufficient to prevent the hardening of the second component alone but insufficient to prevent hardening of the two components in admixture with the inclusion of the hardening catalyst, said components being admixed in proportion to yield a hardenable composition with a molecular constitution approximating one mol of urea to one and one-half mols of formaldehyde.

4. Urea resin composition comprising as one component a neutralized product of condensation initiated under alkaline and continued under acid conditions of one mol of urea with substantially not less than two mols of formaldehyde and as a second component the product of condensation of one mol of urea with from about one to two mols of formaldehyde in the presence of ammonia, and including before use ammonium thiocyanate as a hardening catalyst, said ammonia being in amount insufficient to prevent hardening of the two components in admixture with the inclusion of the hardening catalyst.

5. Method of preparing a urea resin composition which comprises preparing a component stable in water solution by the reaction of about one mol of a urea with substantially not less than two mols of aqueous formaldehyde initiated under alkaline and continued under acid conditions and adjusted to substantial neutrality, and preparing a second component stable in water solution by the reaction of about one mol of urea with about one to one and one-half mols of aqueous formaldehyde in the presence of a hardening inhibitor selected from the group consisting of ammonia and alkyl amines, incorporating before use an acidic hardening catalyst, said inhibitor being present in amount sufficient to prevent the hardening of the second component alone but insufficient to prevent hardening upon admixture of the two components and with the incorporation of the hardening catalyst, and mixing the two components in a proportion to yield a hardenable composition with a molecular constitution approximating one mol of urea to one and one-half mols of formaldehyde.

6. Method of preparing a urea resin composition which comprises preparing a component stable in water solution by the reaction of about one mol of a urea with substantially not less than two mols of aqueous formaldehyde initiated under alkaline and continued under acid conditions and adjusted to substantial neutrality, and preparing a second component stable in water solution by the reaction of about one mol of urea with about one to one and one-half mols of aqueous formaldehyde in the presence of a hardening inhibitor selected from the group consisting of ammonia and alkyl amines, and incorporating before use an acidic hardening catalyst, said inhibitor being present in amount sufficient to prevent the hardening of the second component alone but insufficient to prevent hardening upon admixture of the two components and with the incorporation of the hardening catalyst.

7. Method of preparing a urea resin composition which comprises preparing a component stable in water solution by the reaction of about one mol of a urea with substantially not less than two mols of aqueous formaldehyde initiated under alkaline and continued under acid conditions and adjusted to substantial neutrality, and preparing a second component stable in water solution by the reaction of about one mol of urea with about one to one and one-half mols of aqueous formaldehyde in the presence of a hardening inhibitor selected from the group consisting of ammonia and alkyl amines, and incorporating in the second component an acidic hardening catalyst, said inhibitor being present in amount sufficient to prevent the hardening of the second component alone but insufficient to prevent hardening upon admixture of the two components and with the incorporation of the hardening catalyst.

8. Method of preparing a urea resin composition which comprises preparing a component stable in water solution by the reaction of about one mol of a urea with substantially not less than two mols of aqueous formaldehyde initiated under alkaline and continued under acid conditions and adjusted to substantial neutrality, and preparing a second component stable in water solution by the reaction of about one mol of urea with about one to one and one-half mols of aqueous formaldehyde in the presence of ammonia, and incorporating before use a hardening catalyst comprising ammonium thiocyanate, the ammonia being present in amount insufficient to prevent hardening upon admixture of the two components and with the incorporation of the hardening catalyst.

9. Method of preparing a urea resin composition which comprises preparing a component stable in water solution by the reaction of about one mol of a urea with substantially not less than two mols of aqueous formaldehyde initiated under alkaline and continued under acid conditions and adjusted to substantial neutrality, and preparing a second component stable in water solution by the reaction of about one mol of urea with about one to one and one-half mols of aqueous formaldehyde in the presence of ammonia, incorporating before use a hardening catalyst comprising ammonium thiocyanate, the ammonia being present in amount insufficient to prevent hardening upon admixture of the two components and with the incorporation of the hardening catalyst and mixing the two components in a proportion to yield a hardenable composition with a molecular constitution approximating one mol of urea to one and one-half mols of formaldehyde.

JOHN EDWARD HOWARD HAYWARD.